US010533666B2

(12) United States Patent
Veto et al.

(10) Patent No.: US 10,533,666 B2
(45) Date of Patent: Jan. 14, 2020

(54) SEALING STRUCTURES AND VALVE ASSEMBLIES INCLUDING THE SEALING STRUCTURES

(71) Applicant: The Boeing Company, Chicago, IL (US)

(72) Inventors: Christopher C. Veto, Huntington Beach, CA (US); Gary David Grayson, Issaquah, WA (US)

(73) Assignee: The Boeing Company, Chicago, IL (US)

(*) Notice: Subject to any disclaimer, the term of this patent is extended or adjusted under 35 U.S.C. 154(b) by 329 days.

(21) Appl. No.: 15/405,195

(22) Filed: Jan. 12, 2017

(65) Prior Publication Data
US 2018/0355982 A1   Dec. 13, 2018

(51) Int. Cl.
*F16K 1/46* (2006.01)
*F16J 15/06* (2006.01)

(52) U.S. Cl.
CPC .............. *F16K 1/465* (2013.01); *F16J 15/062* (2013.01); *F16J 15/064* (2013.01)

(58) Field of Classification Search
CPC ........ F16K 1/465; F16J 15/062; F16J 15/064; F16J 15/182; F16J 15/126
USPC ......... 251/214, 366–367, 172, 175; 277/320, 277/637, 641
See application file for complete search history.

(56) References Cited

U.S. PATENT DOCUMENTS

| 2,676,782 | A | * | 4/1954 | Bostock | .................... F16K 1/14 137/516.29 |
| 3,353,783 | A | * | 11/1967 | Bolling, Jr. | ............. F16K 3/207 251/172 |
| 3,370,508 | A | | 2/1968 | Iaia | |
| 3,457,949 | A | | 7/1969 | Coulter | |

(Continued)

FOREIGN PATENT DOCUMENTS

| DE | 3441282 | 6/1985 |
| DE | 19643749 | 4/1998 |

(Continued)

OTHER PUBLICATIONS

Machine-generated English translation of the abstract of RU141548, downloaded from Espacenet.com on Dec. 31, 2018.

(Continued)

*Primary Examiner* — Marina A Tietjen
(74) *Attorney, Agent, or Firm* — D'Ascenzo Intellectual Property Law, P.C.

(57) ABSTRACT

Sealing structures and valve assemblies including the sealing structures. The sealing structures include a first body, which defines a first surface. The sealing structures also include a second body, which defines a second surface. The second body also defines a gland, which extends into the second body from the second surface, defines a gland opening on the second surface, and is free of both a tool entry point and a tool exit point. The second body further defines a retention structure projecting partially across the gland. The sealing structure also includes a resilient sealing body positioned within the gland. The retention structure retains the resilient sealing body within the gland, and the resilient sealing body forms a fluid seal between the first body and the second body when the resilient sealing body is brought into pressing engagement with both the first surface and the gland.

20 Claims, 7 Drawing Sheets

(56) References Cited

U.S. PATENT DOCUMENTS

| | | | | |
|---|---|---|---|---|
| 3,497,177 | A | * | 2/1970 | Hulsey ............... F16K 3/0227 251/172 |
| 3,661,197 | A | * | 5/1972 | Peterson ............... B22C 7/062 164/228 |
| 3,731,905 | A | | 5/1973 | Piet |
| 3,831,951 | A | * | 8/1974 | Patel ............... F16J 15/062 277/641 |
| 3,837,616 | A | * | 9/1974 | Castriota-Scanderbeg ............... F16K 1/228 251/30.01 |
| 3,874,541 | A | | 4/1975 | Lagneaux et al. |
| 4,149,560 | A | | 4/1979 | Berg |
| 4,230,299 | A | * | 10/1980 | Pierce, Jr. ............... E21B 34/02 137/315.28 |
| 4,248,404 | A | * | 2/1981 | Goldman ............... F16K 1/2261 251/175 |
| 4,258,925 | A | * | 3/1981 | Guyton ............... F16K 15/03 137/527 |
| 4,270,441 | A | | 6/1981 | Tuck, Jr. |
| 4,385,514 | A | | 5/1983 | Sassak |
| 4,410,007 | A | * | 10/1983 | Karpenko ............... F16K 15/03 137/516.29 |
| 4,566,485 | A | | 1/1986 | Ruhle |
| 4,828,274 | A | * | 5/1989 | Stannard ............... F16J 15/022 220/378 |
| 4,886,241 | A | * | 12/1989 | Davis ............... F16J 15/166 251/214 |
| 5,041,257 | A | | 8/1991 | Sepso et al. |
| 5,056,758 | A | * | 10/1991 | Bramblet ............... F16J 15/182 251/214 |
| 5,097,864 | A | | 3/1992 | Myers et al. |
| 5,183,075 | A | | 2/1993 | Stein |
| 5,271,429 | A | | 12/1993 | Bauer et al. |
| 5,482,297 | A | | 1/1996 | Burns et al. |
| 5,560,278 | A | * | 10/1996 | Lark ............... F15B 15/2869 277/321 |
| 5,745,834 | A | | 4/1998 | Bampton et al. |
| 5,805,971 | A | | 9/1998 | Akedo |
| 5,826,883 | A | * | 10/1998 | Cho ............... F16J 15/126 277/410 |
| 5,857,897 | A | | 1/1999 | Kreek et al. |
| 5,873,414 | A | * | 2/1999 | von Gynz-Rekowski ............... E21B 21/103 166/319 |
| 6,431,521 | B1 | | 8/2002 | Jones |
| 7,234,680 | B2 | * | 6/2007 | Hull ............... G05D 7/0126 251/121 |
| 7,306,237 | B2 | * | 12/2007 | Tsuji ............... F16J 15/062 277/644 |
| 7,552,908 | B2 | * | 6/2009 | Mitsumata ............... F02M 63/0015 251/129.15 |
| 8,979,068 | B2 | * | 3/2015 | Yeary ............... F16K 5/205 251/172 |
| 2003/0092302 | A1 | | 5/2003 | Conway et al. |
| 2004/0000342 | A1 | | 1/2004 | Takahashi |
| 2004/0232619 | A1 | * | 11/2004 | Bock ............... F16J 15/3296 277/317 |
| 2006/0260693 | A1 | | 11/2006 | Chalk et al. |
| 2008/0018058 | A1 | | 1/2008 | Kobayashi et al. |
| 2008/0029972 | A1 | | 2/2008 | Smathers et al. |
| 2010/0127460 | A1 | * | 5/2010 | Bennett ............... F16J 15/064 277/313 |
| 2014/0345706 | A1 | | 11/2014 | Maibaum et al. |
| 2015/0362080 | A1 | * | 12/2015 | Vu ............... F16K 1/42 137/1 |

FOREIGN PATENT DOCUMENTS

| | | |
|---|---|---|
| EP | 0264203 | 4/1988 |
| RU | 141548 | 6/2014 |
| WO | WO 2010/118501 | 10/2010 |

OTHER PUBLICATIONS

Federal Institute of Industrial Property, Office action for related Russian Application No. 2017139792, dated Oct. 25, 2018.
English translation of Office action for related Russian Application No. 2017139792, dated Oct. 25, 2018.
European Patent Office, Extended European Search Report for related European Application No. 17209789, dated Jun. 11, 2018.
Machine-generated English translation of the abstract of DE 3441282, downloaded from Espacenet.com on Jan. 2, 2018.
Machine-generated English translation of the abstract of DE 19643749, downloaded from Espacenet.com on Aug. 17, 2018.
Murdock, J.W., Mechanics of Fluids, Marks' Standard Handbook for Mechanical Engineers, 11$^{th}$ ed., pp. 3-29 to 3-61, 2007.
Martinez et al., "Lessons Learned from the Design Certification, and Operation of the Space Shuttle Integrated Main Propulsion System (IMPS)," 47th AIAA/ASME/SAE/ASEE Joint Propulsion Conference & Exhibit, Jul. 31-Aug. 3, 2011, San Diego, California.
Barrett et al., "Space Shuttle Simplified LO2 Check Valve Development Tests," Journal of Propulsion and Power, vol. 11, No. 2, Mar.-Apr. 1995.
"Flow of Fluids Through Valves, Fittings, and Pipe," Crane Valves North America, Technical Paper No. 410, 1988.

\* cited by examiner

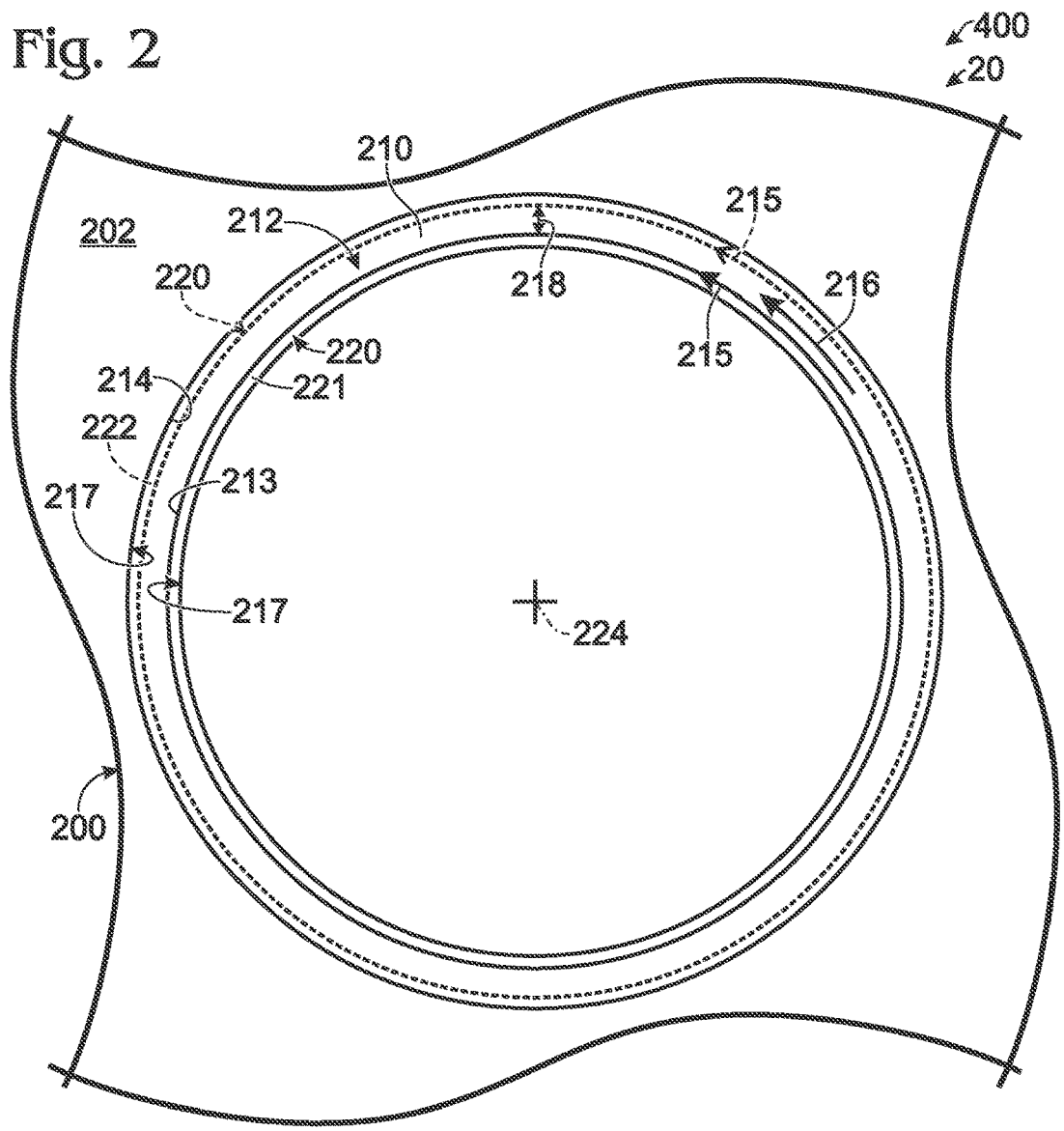

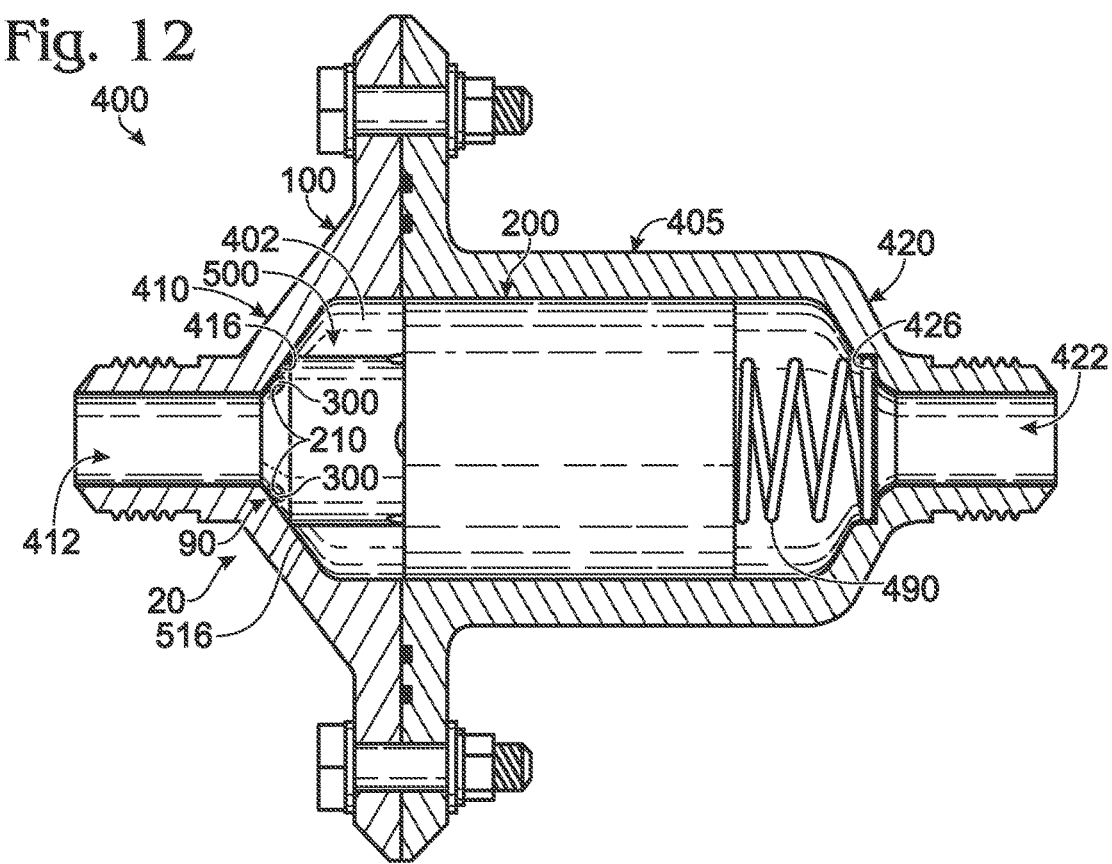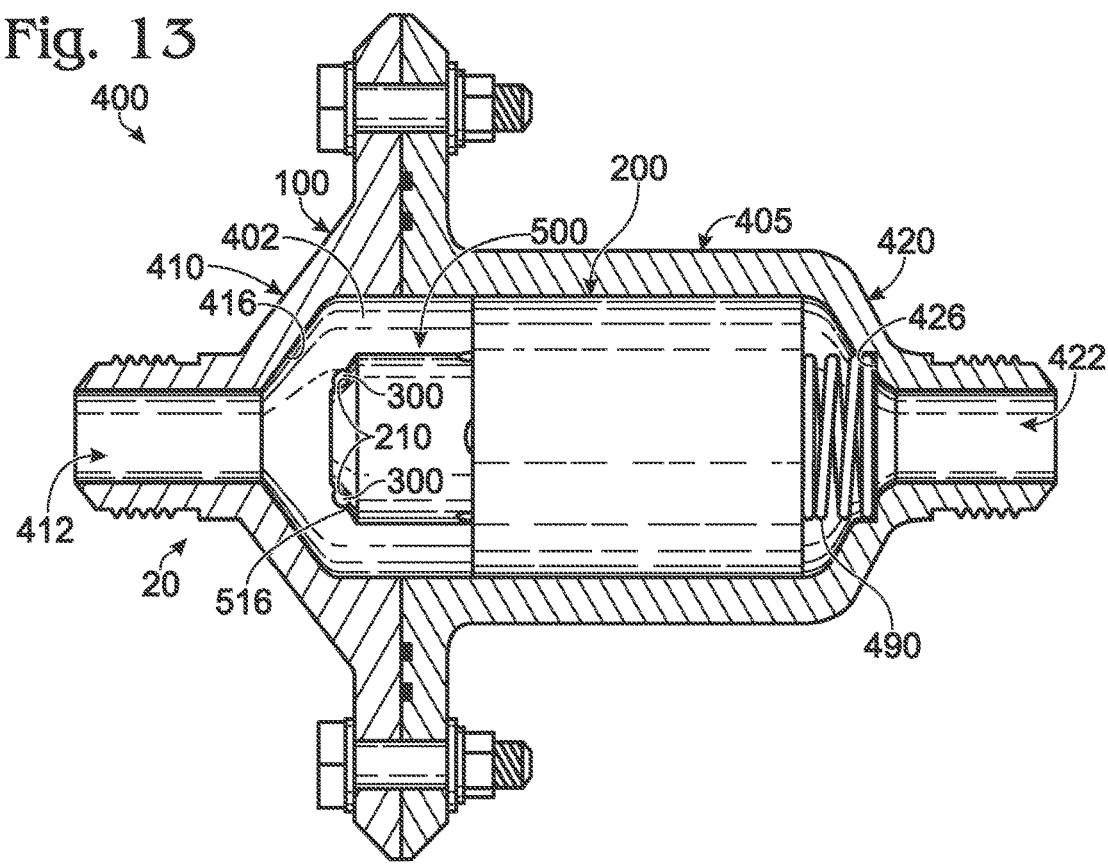

SEALING STRUCTURES AND VALVE ASSEMBLIES INCLUDING THE SEALING STRUCTURES

This invention was made with Government support under Contract No. HR0011-14-9-0005 awarded by Department of Defense Advanced Research Projects Agency. The Government has certain rights in this invention.

FIELD

The present disclosure relates generally to sealing structures and to valve assemblies including the sealing structures.

BACKGROUND

Sealing structures may be utilized to form a fluid seal between a first body and a second body. Some sealing structures utilize a resilient sealing body, such as an O-ring, to form the fluid seal between the first body and the second body. In such sealing structures, a gland, land, channel, and/or groove may be formed within the first body and/or within the second body, and the resilient sealing body may be positioned within the gland, thereby retaining the resilient sealing body at, or within, an interface region between the first body and the second body.

In certain applications, such as valve assemblies, the sealing structure may be repeatedly transitioned between a closed position, in which the fluid seal is present, a neutral (i.e. zero-force) position, and/or an open position, in which the fluid seal is not present, and it may be desirable to retain the resilient sealing body within the gland regardless of the configuration of the sealing structure. It is known to utilize an adhesive and/or bonding agent to retain the resilient sealing body within the gland; however, adhesives may be unsuitable for some applications, may fail when the sealing structure is repeatedly transitioned between the closed position and the open position, and/or may fail when the sealing structure is subjected to extreme temperatures, to extreme temperature variation, and/or to certain fluids, such as solvents. Thus, there exists a need for improved sealing structures and/or for valve assemblies including the improved sealing structures.

SUMMARY

Sealing structures and valve assemblies including the sealing structures are disclosed herein. The sealing structures include a first body, which defines a first surface. The sealing structures also include a second body, which defines a second surface. The second body also defines a gland, which extends into the second body from the second surface and defines a gland opening on the second surface. The gland is free of both a tool entry point and a tool exit point. The second body further defines a retention structure projecting partially across the gland to at least partially define the gland opening. The sealing structure also includes a resilient sealing body that is positioned within the gland. The retention structure retains the resilient sealing body within the gland, and the resilient sealing body forms a fluid seal between the first body and the second body when the resilient sealing body is brought into pressing engagement with both the first surface and the gland.

BRIEF DESCRIPTION OF THE DRAWINGS

FIG. 2 is a schematic top view of a second body of the sealing structure of FIG. 1.

FIG. 3 is a schematic cross-sectional view of a gland according to the present disclosure.

FIG. 4 is a schematic cross-sectional view of a gland according to the present disclosure.

FIG. 5 is a schematic cross-sectional view of a gland according to the present disclosure.

FIG. 6 is a schematic cross-sectional view of a gland according to the present disclosure.

FIG. 12 is a cutaway side view of a valve assembly, according to the present disclosure, in a closed position.

FIG. 13 is a cutaway side view of a valve assembly, according to the present disclosure, in an open position.

DESCRIPTION

Figure 1:
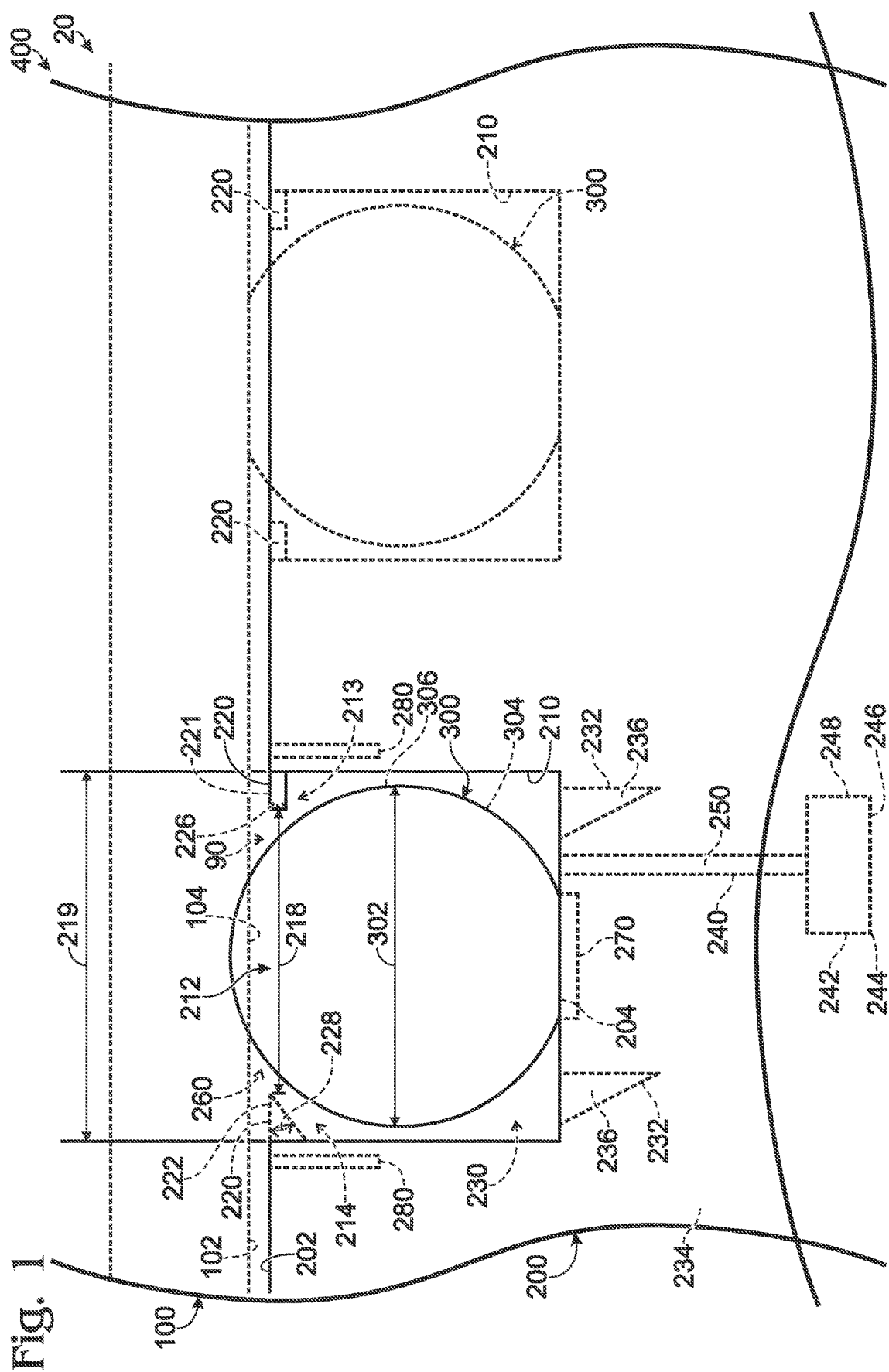
FIG. 1 is a schematic cross-sectional view of examples of a sealing structure according to the present disclosure.

FIGS. 1-20 provide illustrative, non-exclusive examples of sealing structures 20, of valve assemblies 400, and/or of portions of valve assemblies 400, according to the present disclosure. Elements that serve a similar, or at least substantially similar, purpose are labeled with like numbers in each of FIGS. 1-20, and these elements may not be discussed in detail herein with reference to each of FIGS. 1-20. Similarly, all elements may not be labeled in each of FIGS. 1-20, but reference numerals associated therewith may be utilized herein for consistency. Elements, components, and/or features that are discussed herein with reference to one or more of FIGS. 1-20 may be included in and/or utilized with any of FIGS. 1-20 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic cross-sectional view of examples of a sealing structure 20, according to the present disclosure, while FIG. 2 is a schematic top view of a second body 200 of sealing structure 20 of FIG. 1. Sealing structures 20 may be utilized and/or may form a portion of a valve assembly 400, examples of which are disclosed herein.

As illustrated in FIG. 1, sealing structure 20 may include a first body 100, which defines a first surface 102, and includes a second body 200, which defines a second surface 202 and a resilient sealing body 300. Second body 200 also defines a gland 210 that extends into second body 200 from second surface 202 and defines a gland opening 212 on the second surface. Second body 200 further is operatively attached to and/or defines a retention structure 220 that projects at least partially across gland 210 and at least partially defines gland opening 212. Resilient sealing body 300 is positioned within gland 210 and retained within gland 210 by retention structure 220. In addition, and as illustrated in FIG. 1, resilient sealing body 300 forms a fluid seal 90 between first body 100 and second body 200 when resilient sealing body 300 is brought into pressing contact, or engagement, with both first surface 102 and gland 210.

During operation, or use, of sealing structures 20 and/or of assemblies, such as valve assembly 400, that include sealing structures 20, sealing structure 20 may be repeatedly, periodically, and/or irregularly cycled between a closed position and an open position. When in the closed position, resilient sealing body 300 may be positioned within gland 210 and may be compressed between first body 100 and second body 200 to form and/or define fluid seal 90. This closed position is illustrated in FIG. 1 by first body 100, which is illustrated in dashed lines, pressing against resilient sealing body 300. The closed position also is illustrated, in FIG. 12, for an example of valve assembly 400. When sealing structure 20 is in the closed position, resilient sealing body 300 may be at least substantially surrounded by first body 100 and second body 200, thereby retaining resilient sealing body 300 within gland 210 and/or preventing separation of resilient sealing body 300 from first body 100 and/or from second body 200.

Figure 20:
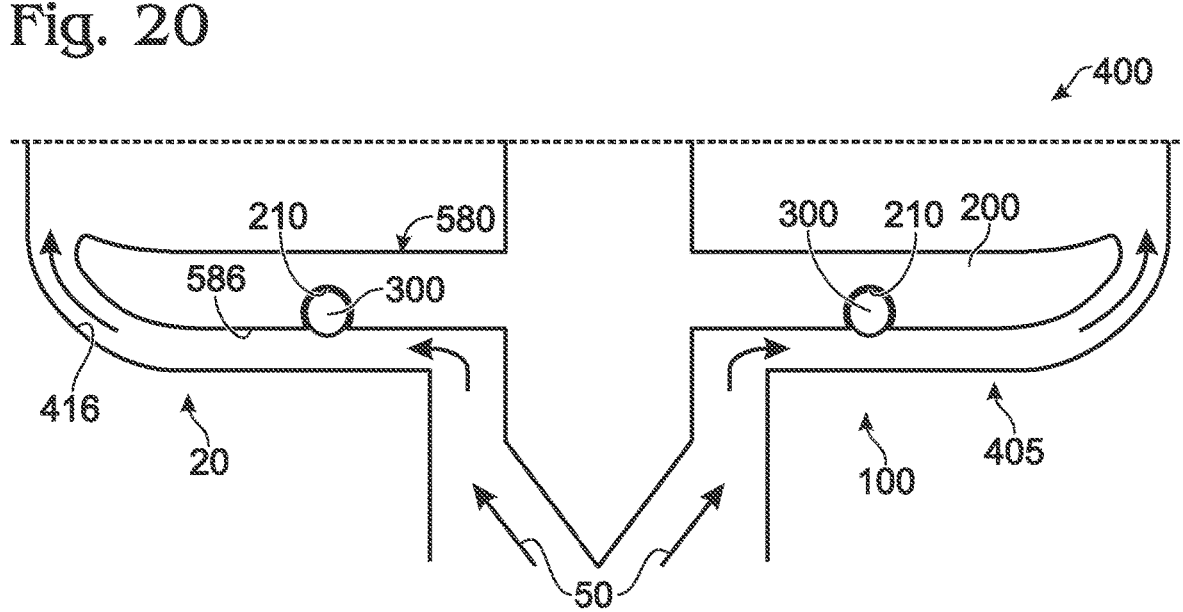
FIG. 20 is a schematic cross-sectional view of a portion of a membrane check valve assembly according to the present disclosure.

In contrast, when sealing structure 20 is in the open position and/or in a neutral position, resilient sealing body 300 may not be compressed between first body 100 and second body 200. The open position is illustrated in FIG. 1 by the absence of optional first body 100 and also is illustrated in FIGS. 13 and 20 for examples of valve assemblies 400 in which first body 100 and second body 200 do not compress resilient sealing body 300 therebetween. Stated another way, and when sealing structure 20 is in the open position, first body 100 may not be in physical contact with resilient sealing body 300 and/or a distance between first body 100 and second body 200 may be greater than a corresponding distance when sealing structure 20 is in the closed position. As such, resilient sealing body 300 may protrude from gland opening 212 and/or it may be possible for resilient sealing body 300 to move out of gland 210 via gland opening 212. However, and as discussed, retention structure 220 retains resilient sealing body 300 within gland 210 and/or prevents separation of resilient sealing body 300 from second body 200.

In contrast with sealing structures 20 according to the present disclosure, conventional sealing structures that utilize a gland and a resilient sealing body, which is positioned within the gland, to form a fluid seal between two bodies generally are configured to be assembled to form a fluid seal and subsequently to maintain the fluid seal throughout an operational lifetime, or at least during normal operation of, the sealing structure. Stated another way, conventional sealing structures that utilize a gland and a resilient sealing body, which is positioned within the gland, to form a fluid seal generally are not configured to be repeatedly cycled between an open position and a closed position. Thus, a potential for the resilient sealing body to move out of the gland of the conventional sealing structure is quite low. Cyclic loading, thermal gradients, vibration loading, and/or other physical and/or chemical influences, such as instances where preloading or lock-nuts are not applied, also may be detrimental to the operation, or sealing ability, of such conventional sealing structures.

In contrast, sealing structures 20 according to the present disclosure generally are configured for operation within assemblies, such as valve assemblies 400, in which the sealing structure is repeatedly cycled between the open position and the closed position. In such an assembly, the resilient sealing body of conventional sealing structures may move out of the gland, thereby rendering the sealing assembly inoperable. However, in sealing assemblies 20, according to the present disclosure, retention structure 220 retains the resilient sealing body within the gland during this cycling. As an example, and as discussed in more detail herein, the resilient sealing body may be configured for a snap-fit within the gland.

The potential for the resilient sealing body of conventional sealing structures to move out of the gland is increased when the sealing assembly is thermally cycled, utilized in a hot environment, utilized in a lukewarm and/or ambient environment, utilized in a cold environment, and/or utilized in a cryogenic environment. However, sealing structures 20 according to the present disclosure overcome this limitation via retention of resilient sealing body 300 within gland 210 with retention structure 220.

Retention structure 220 may include any suitable structure that may be adapted, configured, designed, sized, shaped, and/or constructed to project at least partially across gland 210, to at least partially define gland opening 212, to retain resilient sealing body 300 within gland 210, and/or to prevent separation of resilient sealing body 300 from second body 200. Retention structure 220 may have and/or define any suitable shape. As an example, and as illustrated in FIG. 2, retention structure 220 may be symmetric, rotationally symmetric, longitudinally symmetric, and/or radially symmetric about a central point 224 and/or off-center foci. Stated another way, retention structure 220 may be continuous along a length 216, along a perimeter 215, and/or along an edge 217 of gland 210. Retention structure 220 also may be radially balanced.

Second body 200 and/or retention structure 220 may be formed utilizing a manufacturing process, such as an additive manufacturing process and/or a casting process, that permits formation of a uniform retention structure 220 and/or that permits formation of a retention structure 220 that does not include, or exhibit, tooling entry and/or exit points, as may be required in subtractive manufacturing processes. Such a configuration for retention structure 220 may provide a stronger retention structure 220 and/or may provide a stronger sealing structure 20 when compared to a retention structure that is not symmetrical and/or that exhibits tooling entry and/or exit points.

With reference to FIG. 1, retention structure 220 may have and/or define a rounded edge 226, which also may be referred to herein as a rounded resilient sealing body-compressing edge 226. Rounded edge 226 may at least partially define gland opening 212, may contact resilient sealing body 300 when resilient sealing body 300 is positioned within gland 210, and/or may press against, or compress, resilient sealing body 300 as resilient sealing body 300 is inserted into, or positioned within, gland 210. Resilient sealing body 300 may be compressed upon insertion into gland 210, and the presence of rounded edge 226 may decrease a potential for damage to resilient sealing body 300 when resilient sealing body 300 is inserted within gland 210. The rounded edge may, in one instantiation, be entirely omitted, be comprised of a multitude of curves or a multitude of small, tangential surfaces, the latter for use with doublet-lattice modeling.

As illustrated in FIGS. 1-2, retention structure 220 may include a first retaining edge 221 and a second retaining edge 222. First retaining edge 221 may project from a first side 213 of gland opening 212, while second retaining edge 222 may project from a second side 214 of gland opening 212. In addition, first retaining edge 221 may be continuous about a first circumference of first side 213. Similarly, second retaining edge 222 may be continuous about a second circumference of second side 214.

As illustrated in FIG. 1, first retaining edge 221 and/or second retaining edge 222 may have and/or define an edge angle 228 relative to second surface 202 of second body 200. Edge angle 228 may be selected based upon one or more design constraints of sealing structure 20, of resilient sealing body 300, and/or of a manufacturing process that is utilized to manufacture at least second body 200 and may have any suitable value. As examples, edge angle 228 may be at least 10 degrees, at least 15 degrees, at least 20 degrees, at least 25 degrees, at least 30 degrees, at least 35 degrees, at least 37 degrees, at least 39 degrees, and/or at least 41 degrees. Additionally or alternatively, edge angle 228 may be at most 60 degrees, at most 55 degrees, at most 53 degrees, at most 51 degrees, at most 49 degrees, at most 47 degrees, and/or at most 45 degrees.

Gland opening 212 may define an opening width 218. Opening width 218 may be measured in a direction that is parallel to second surface 202 and/or may be a minimum width of gland opening 212 as measured in the direction that is parallel to second surface 202. Opening width 218 may be uniform, at least substantially uniform, constant, and/or at least substantially constant along length 216 of gland opening 212, as illustrated in FIG. 2.

Prior to being positioned within gland 210, resilient sealing body 300 may define a maximum transverse cross-sectional dimension 302. Opening width 218 may be less than maximum transverse cross-sectional dimension 302. As examples, opening width 218 may be at most 95%, at most 90%, at most 85%, at most 80%, and/or at most 75% of maximum transverse cross-sectional dimension 302 of the resilient sealing body. Additionally or alternatively, opening width 218 may be at least 45%, at least 48%, at least 50%, at least 53%, at least 55%, at least 60%, at least 65%, at least 70%, at least 75%, at least 80%, and/or at least 85% of maximum transverse cross-sectional dimension 302 of the resilient sealing body. Stated another way, opening width 218 may be sized to regain resilient sealing body 300 within gland 210, may be sized to compress resilient sealing body 300 upon insertion of resilient sealing body 300 into gland 210, and/or may be sized for the snap-fit between resilient sealing body 300 and gland 210. Dimensions of resilient sealing body 300 additionally or alternatively may be described, or quantified, by width, height, and radius (WHR) dimensions of the resilient sealing body. The width may correspond to maximum transverse cross-sectional dimension 302. The height may be measured perpendicular to maximum transverse cross-sectional dimension 302. The radius may be a distance between central point 224 of FIG. 2 and the resilient sealing body.

Gland 210 may define a maximum transverse cross-sectional extent 219, which may be measured in a direction that is parallel to second surface 202, and opening width 218 may be less than maximum cross-sectional extent 219. As examples, opening width 218 may be at most 95%, at most 90%, at most 85%, at most 80%, and/or at most 75% of maximum transverse cross-sectional extent 219. Additionally or alternatively, opening width 218 may be at least 50%, at least 55%, at least 60%, at least 65%, at least 70%, at least 75%, and/or at least 80% of maximum transverse cross-sectional extent 219.

Gland 210 may have and/or define any suitable shape that may at least partially contain and/or house resilient sealing body 300 and/or that may permit resilient sealing body 300 to be positioned therein. As an example, and as illustrated in FIG. 1, gland 210 may be square, at least partially square, rectangular, and/or at least substantially rectangular. As another example, and as illustrated in FIG. 3, gland 210 may be circular, at least partially circular, arcuate, at least partially arcuate, and/or gibbous. As the Gibbous shape is more or less a partially immersed ellipse or circle, its industrial definition may chiefly center on its WHR (Width-Height-Radius) dimensions, where R may include two or more apsis radii. When gland 210 is gibbous, gland 210 also may be referred to herein as a GOL or Gibbous O-ring Layering.

As yet another example, and as illustrated in FIG. 4, gland 210 may be triangular and/or at least partially triangular. As another example, and as illustrated in FIG. 5, gland 210 may be elliptical and/or at least partially elliptical. As yet another example, and as illustrated in FIG. 6, gland 210 may be pentagonal, at least partially pentagonal, diamond-shaped, and/or at least partially diamond-shaped. As another example, and as illustrated in FIGS. 1, 4, and 6, gland 210 may be polygonal and/or at least partially polygonal. The gland may be stacked, double-gibbous, and/or triple or more, or some other variant, so as to contain two, or three or more O-rings in a single gland for blow-out redundancy.

Similar to retention structure 220, gland 210 may be symmetric, rotationally symmetric, and/or radially symmetric about central point 224 of FIG. 2. Additionally or alternatively, gland 210 may be free from, or may not exhibit, a tool entry point and/or a tool exit point. Additionally or alternatively, a transverse cross-sectional shape of gland 210 may be constant, or at least substantially constant. Gland 210 also may be referred to herein as a channel 210, a land 210, and/or a groove 210.

Figure 15:
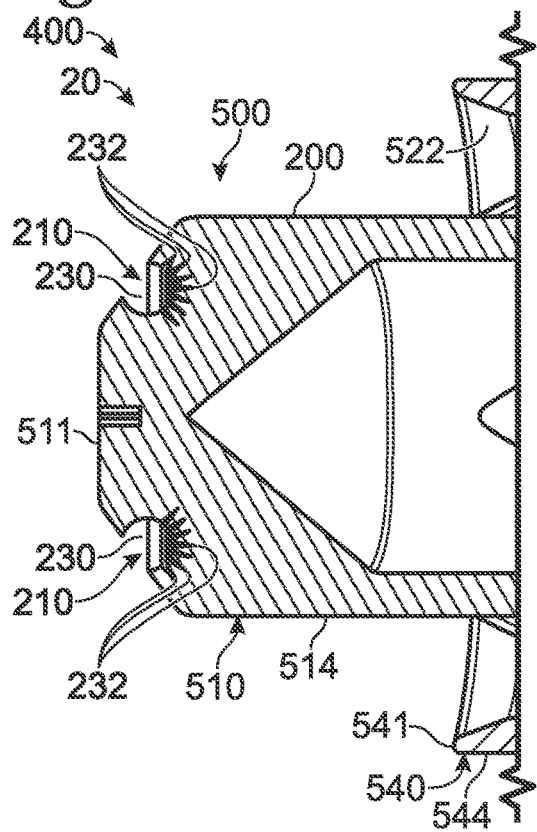
FIG. 15 is a schematic cross-sectional view of a portion of a poppet according to the present disclosure.

As illustrated in dashed lines in FIG. 1 and in solid lines in FIG. 15, gland 210 may include a resilient sealing body-retaining region 230 and one or more projecting regions 232 that project away from resilient sealing body-retaining region 230 and/or into second body 200. Projecting regions 232 also may be referred to herein as sun-ray extensions 232. The sun-ray beam extensions may include fillets to avoid stress-centering and/or stress-fracture promulgation(s).

Projecting regions 232, when present, may be adapted, configured, sized, and/or shaped to permit upstream-born fluid flow around resilient sealing body 300 when resilient sealing body 300 is positioned within gland 210. Additionally or alternatively, projecting regions 232, when present, may be adapted, configured, sized, and/or shaped to facilitate heat transfer between resilient sealing body 300 and second body 200. Additionally or alternatively, projecting regions 232 may be adapted, configured, sized, and/or shaped to facilitate deformation of the transverse cross-sectional shape of gland 210 based, at least in part, on a temperature of second body 200 and/or on a clamping force between second body 200 and first body 100.

Figure 7:
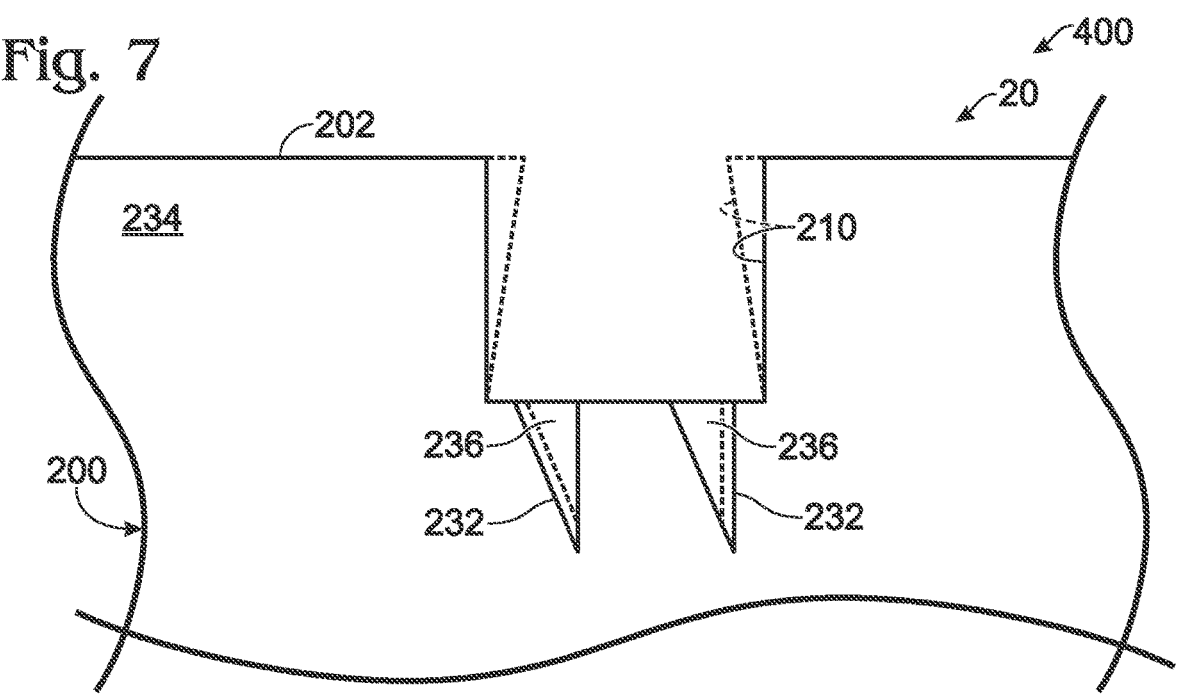
FIG. 7 is a schematic cross-sectional view of a gland according to the present disclosure.

Projecting regions 232 may include, be, and/or define a void, an open space, and/or a volume. Additionally or alternatively, and as illustrated in dashed lines in FIG. 1, second body 200 may be formed from a first material 234 with a first coefficient of thermal expansion and a second material 236 with a second coefficient of thermal expansion that is different from the first coefficient of thermal expansion. Under these conditions, gland 210 may be defined and/or bordered by both first material 234 and second material 236. Stated another way, projecting regions 232 may be filled with second material 236. Under these conditions, a location, shape, geometry, and/or coefficient of thermal expansion of first material 234 and second material 236 may be selected to generate a directed, controlled, and/or desired deformation of gland 210 with changes in the temperature of second body 200. This is illustrated in FIG. 7, which illustrates, in solid lines, a shape of gland 210 when second body 200 is at a first temperature and, in dashed lines, the shape of gland 210 when second body 200 is at a second temperature that is different from the first temperature.

Figure 16:
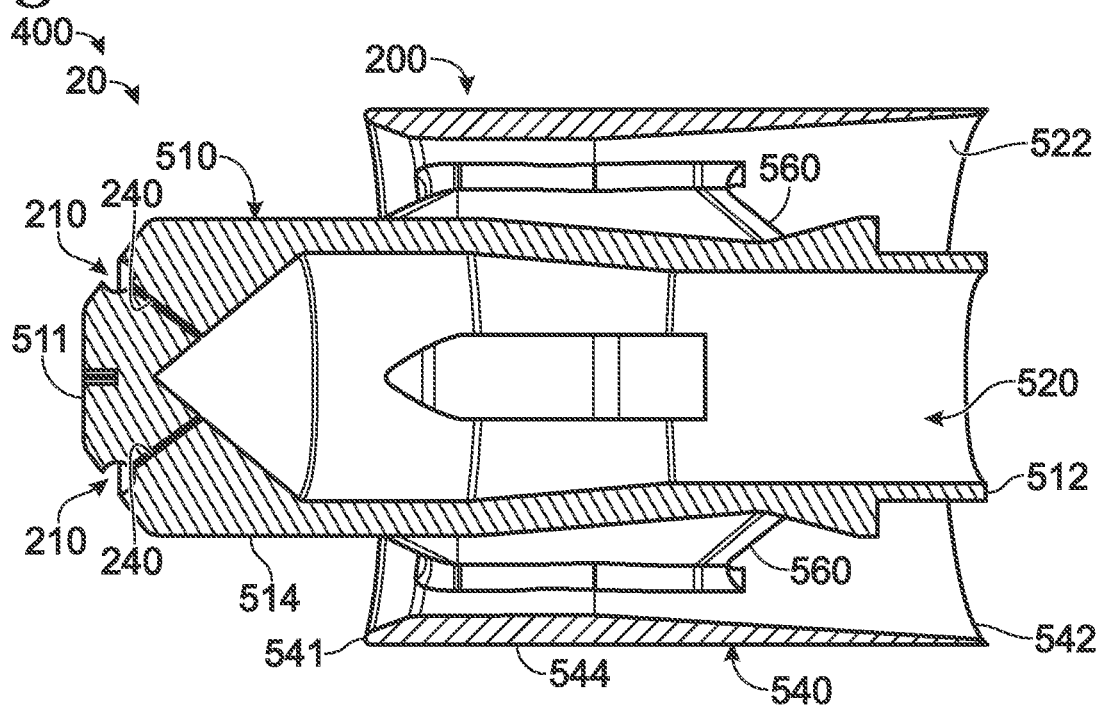
FIG. 16 is a schematic cross-sectional view of a poppet according to the present disclosure.
Figure 17:
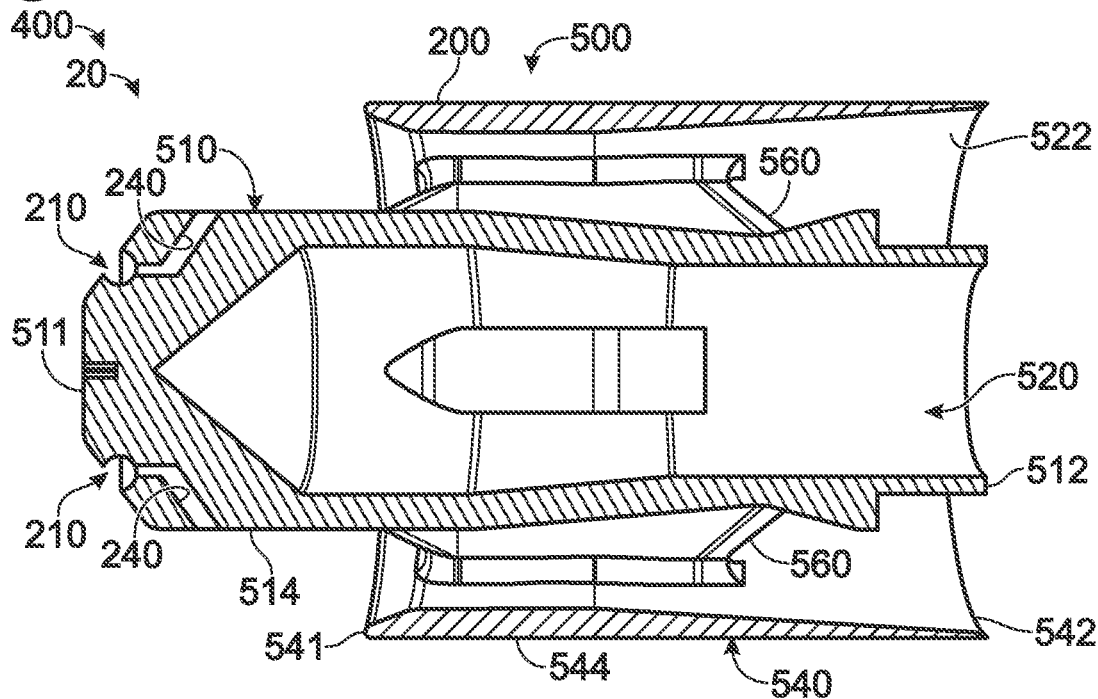
FIG. 17 is a schematic cross-sectional view of a poppet according to the present disclosure.
Figure 18:
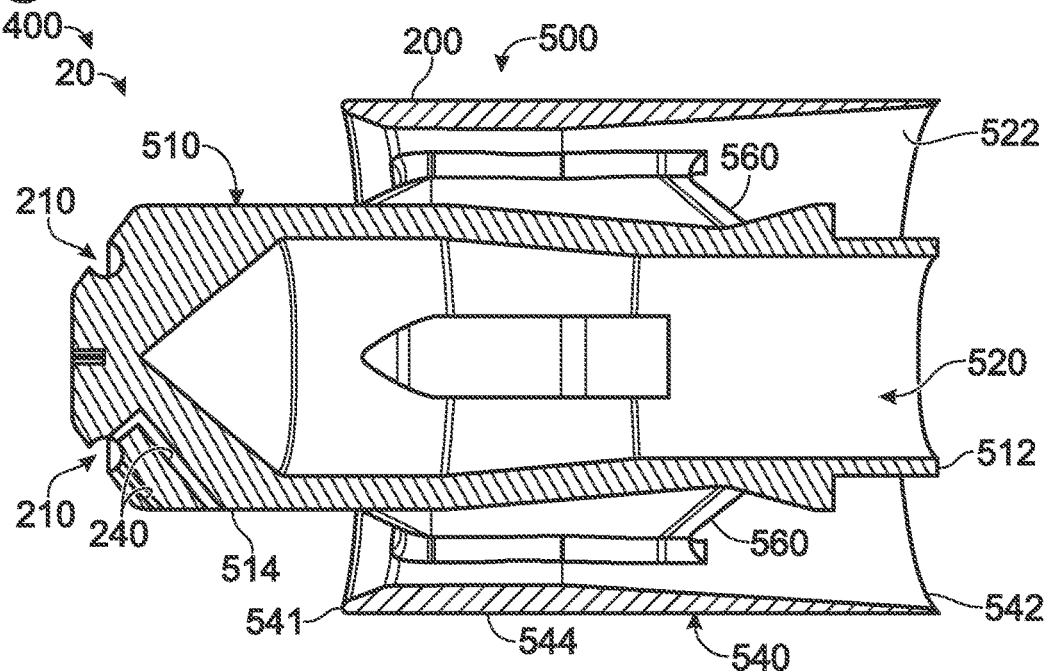
FIG. 18 is a schematic cross-sectional view of a poppet according to the present disclosure.

As illustrated in dashed lines in FIG. 1 and in solid lines in FIGS. 16-18, second body 200 may include and/or define a fluid conduit 240 that opens into gland 210. Fluid conduit 240 also may be referred to herein as a fluid distribution network 240 and/or as a dendritic network 240. Fluid conduit 240 may be configured to provide and/or supply a backpressure to gland 210, such as to control and/or regulate a separation pressure and/or a cracking pressure of sealing structure 20. As an example, and as illustrated in FIG. 1, sealing structure 20 may include and/or be in fluid communication with a back pressure source 242, such as via fluid conduit 240; and back pressure source 242 may be configured to provide and/or supply the back-pressure to gland 210. The separation pressure may be defined as a pressure at which first body 100 and second body 200 begin to move away from one another but at which fluid seal 90 is maintained. The cracking pressure may be defined as a pressure at which fluid flow between first body 100 and resilient sealing body 300 is initiated.

Additionally or alternatively, sealing structure 20 may include and/or be in fluid communication with a lubricant source 244, and fluid conduit 240 may fluidly interconnect gland 210 and lubricant source 244. This may permit lubricant source 244 to provide a lubricant to gland 210 via fluid conduit 240. The lubricant may improve the friction, wear, and/or other tribological characteristics of sealing structure 20 when compared to conventional sealing structures that do not include lubricant source 244.

Additionally or alternatively, sealing structure 20 may include and/or be in fluid communication with a motive fluid source 246, and fluid conduit 240 may fluidly interconnect gland 210 and motive fluid source 246. Motive fluid source 246 may be configured to provide a motive force for sweeping motion of resilient sealing body 300 within gland 210.

Additionally or alternatively, sealing structure 20 may include and/or be in fluid communication with a sensor 248, and fluid conduit 240 may fluidly interconnect gland 210 and sensor 248. Sensor 248 may be configured to detect a pressure, to detect a pressure within gland 210, and/or to detect a presence, or absence, of fluid seal 90 between first surface 102 and second surface 202.

As also illustrated in dashed lines in FIG. 1, sealing structure 20 additionally or alternatively may include an electrically conductive conduit 250. Electrically conductive conduit 250 may extend within second body 200 and/or may extend in electrical communication with gland 210. Additionally or alternatively, electrically conductive conduit 250 may electrically interconnect gland 210 with any suitable structure, such as sensor 248.

As also illustrated in dashed lines in FIG. 1, sealing structure 20 may include a seal detection structure 260. Seal detection structure 260 may be configured to detect the presence of, absence of, and/or chatter of fluid seal 90 between first surface 102 and second surface 202. Additionally or alternatively, seal detection structure 260 may be configured to detect damage to the fluid seal, the potential for damage to the fluid seal, and/or seal rupturing impact between the first body and the second body.

The fluid seal may be detected in any suitable manner. As an example, seal detection structure 260 may include a first electrically conductive surface 104, which is defined on first body 100 and/or forms at least a portion of first surface 102, and a second electrically conductive surface 204, which is defined on second body 200 and/or forms at least a portion of second surface 202 and/or of gland 210. Under these conditions, seal detection structure 260 may be configured to detect electrical contact between first electrically conductive surface 104 and second electrically conductive surface 204. The O-ring may be comprised in part or in whole of a conductive yet malleable material, such as gold, or other conductive material, such as silver or platinum.

It is within the scope of the present disclosure that resilient sealing body 300 may include and/or be an electrically conductive resilient sealing body 304. Under these conditions, electrically conductive resilient sealing body 304 may be configured to form, or complete, the electrical contact between first electrically conductive surface 104 and second electrically conductive surface 204. Stated another way, seal detection structure 260 may be configured to detect electrical contact between first electrically conductive surface 104 and second electrically conductive surface 204 through and/or via electrically conductive resilient sealing body 304.

As also illustrated in dashed lines in FIG. 1, second body 200 may include a magnetic material 270 (e.g., neodymium) that is in magnetic communication with and/or partially defines gland 210. Under these conditions, resilient sealing body 300 may include and/or be a magnetic resilient sealing body 306, and sealing structure 20 further may retain magnetic resilient sealing body 306 within gland 210 via a magnetic interaction between magnetic material 270 and magnetic resilient sealing body 306.

Figure 19:
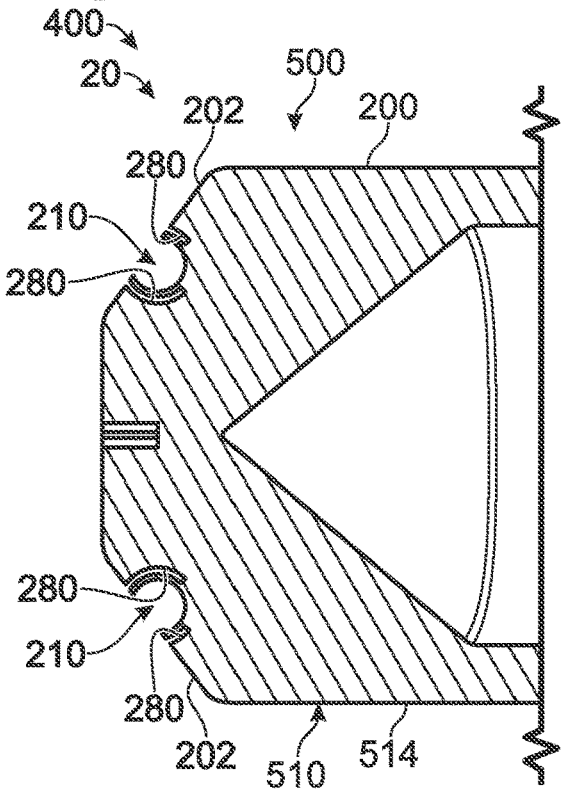
FIG. 19 is a schematic cross-sectional view of a portion of a poppet according to the present disclosure.

As illustrated in dashed lines in FIG. 1 and in solid lines in FIG. 19, second body 200 may include one or more slits 280. Slits 280, when present, may be proximal to but spaced-apart from gland 210 and may extend from second surface 202 and into second body 200. Slits 280 may include a single slit 280 or a pair, or more, of opposed slits 280 on opposed sides of gland 210. Slits 280 may be configured to facilitate deformation of the transverse cross-sectional shape of gland 210, such as may be caused by the clamping force between first body 100 and second body 200.

It is within the scope of the present disclosure that sealing structure 20 may include any suitable number of glands 210 with corresponding resilient sealing bodies 300 positioned therein. As an example, sealing structure 20 may include a first gland 210, a corresponding first resilient sealing body 300, and a corresponding first retention structure 220, as illustrated in solid lines in FIG. 1. In addition, sealing structure 20 also may include a second gland 210, a corresponding second resilient sealing body 300, and a corresponding second retention structure 220, as illustrated in dashed lines in FIG. 1. FIG. 1 illustrates second gland 210 as being defined by second body 200 and/or by the same body as the body that defines first gland 210. However, it is within the scope of the present disclosure that second body 200 may define one gland 210, such as the first gland, and that first body 100 may define another gland 210, such as the second gland. More glands and seals may be included for manned space-flight and/or exotic environments; as an example, seven seals of equal or varying geometries may be equally or non-equally spaced.

The presence of two or more glands 210 with corresponding retention structures 220 and resilient sealing bodies 300, in sealing structure 20, may provide a number of benefits over sealing structures 20 that include only a single gland 210, a single resilient sealing body 300, and a single retention structure 220. As examples, the second resilient sealing body 300 may be formed from a different material, may be configured to seal at a different pressure, and/or may be configured to seal at a different temperature relative to the first resilient sealing body 300. As another example, the first and second resilient sealing bodies 300 may provide redundancy within sealing structure 20.

Figure 8:
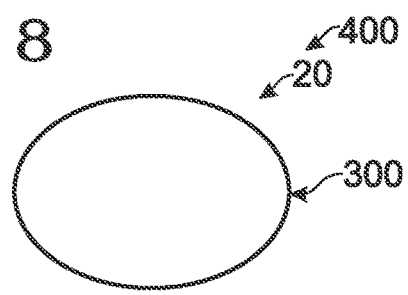
FIG. 8 is a schematic cross-sectional view of a resilient sealing body that may be utilized with the sealing structures according to the present disclosure.
Figure 9:
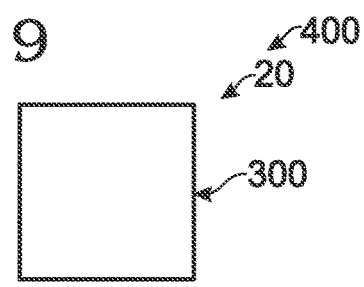
FIG. 9 is a schematic cross-sectional view of a resilient sealing body that may be utilized with the sealing structures according to the present disclosure.
Figure 10:
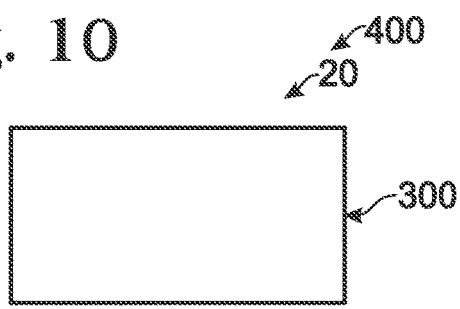
FIG. 10 is a schematic cross-sectional view of a resilient sealing body that may be utilized with the sealing structures according to the present disclosure.
Figure 11:
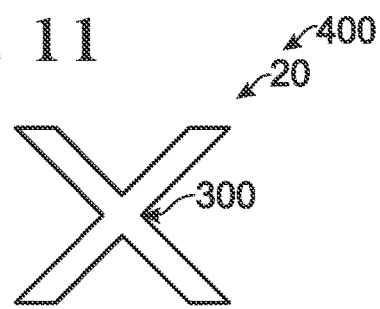
FIG. 11 is a schematic cross-sectional view of a resilient sealing body that may be utilized with the sealing structures according to the present disclosure.
Figure 14:
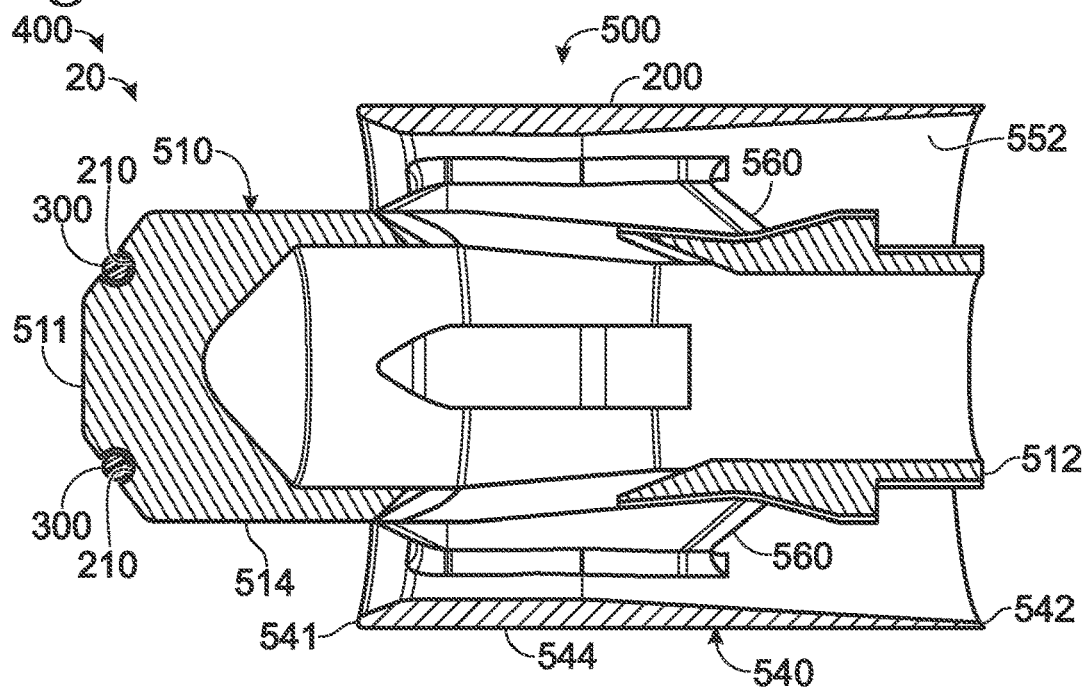
FIG. 14 is a schematic cross-sectional view of a poppet according to the present disclosure.

Resilient sealing body 300 may include, define, and/or have any suitable shape. As an example, resilient sealing body 300 may include, or be, an O-ring. As additional examples, a transverse cross-sectional shape of resilient sealing body 300 may be round or at least partially round, as illustrated in FIG. 1, elliptical or at least partially elliptical, as illustrated in FIG. 8, square or at least partially square, as illustrated in FIG. 9, rectangular or at least partially rectangular, as illustrated in FIG. 10, and/or X-shaped or at least partially X-shaped, as illustrated in FIG. 11. As additional examples, the transverse cross-sectional shape of resilient sealing body 300 may be arcuate, at least partially arcuate, polygonal, at least partially polygonal, pentagonal, at least partially pentagonal, triangular, and/or at least partially triangular. The cross-sectional shape of the sealing body may vary along a length of the body. The body may be Mobius-shaped. The body may be hollow, porous, and/or permeable.

It is within the scope of the present disclosure that resilient sealing body 300 may include and/or be formed from any suitable material and/or materials. As examples, resilient sealing body 300 may include one or more of a polymer, a fluoropolymer, a rubber, a nitrile rubber, an ethylene polyene diene terpolymer, a fluorosilicone, a polytetrafluoroether, a polyurethane, a silicone, a fluoroelastomer, a metal, a steel, a stainless steel, copper, an electrically conductive material, copper, gold, an electrically insulating material, a carbon matrix composite (CMC), and/or an electrostatic discharge-resistant material.

Resilient sealing body 300 also may be formed in any suitable manner. As an example, resilient sealing body 300 may be separately formed, such as via molding, and subsequently inserted into gland 210. As another example, resilient sealing body may be injected into gland 210 as a sealing liquid and subsequently cured therein. Under these conditions, a vacuum may be applied to an exposed surface of the sealing liquid, thereby causing the sealing liquid to at least partially project from gland 210. Additionally or alternatively, gland 210 may be over-filled with the sealing liquid, thereby causing the sealing liquid to project from gland 210. The sealing liquid, when utilized, may be cured in any suitable manner, such as via and/or utilizing heating, cooling, chemical curing, electromagnetic curing, and/or ultraviolet light curing.

As illustrated in FIG. 1, resilient sealing body 300 may be configured to be compressed, or deformed by compression between, first body 100 and second body 200. With this in mind, resilient sealing body 300 may have and/or define any suitable hardness. As examples, a Shore hardness of resilient sealing body 300 may be in the A50 to A55 range, in the A60 to A75 range, in the A80 to A90 range, and/or in the D51 to D55 range.

First body 100 and/or second body 200 may be formed from, or may include, any suitable material and/or materials. As examples, first body 100 and/or second body 200 may include one or more of an aluminum alloy, Al10SiMg, an aluminum silicon magnesium alloy, a superalloy, a titanium alloy, Ti-6Al-4V, a titanium aluminum vanadium alloy, a polymer, a polyetherketoneketone, an acrylonitrile butadiene styrene, a poly(lactic) acid, Inconel™, stainless steel, a ferrous metal, an organic material, a naturally occurring material, a flexible material, an inflatable material, and/or bamboo. When first body 100 and/or second body 200 includes the inflatable material and/or the flexible material, first body 100 and/or second body 200 also may include a rigidity-enhancing structure configured to increase load rigidity, increase twisting rigidity, and/or increase hoop stress. As another example, first body 100 and/or second body 200 may be formed via and/or utilizing an additive manufacturing (industrially referred to as "AM") process, in some examples comprised of corrosion-resistant materials including but not limited to Inconel 626™ and/or Inconel 718™.

First body 100 and/or second body 200 additionally or alternatively may include a functionally gradient material (FGM). The FGM, when present, may be selected to prevent, to suppress, and/or to reduce a potential for, arcing among first body 100, second body 200, and/or resilient sealing body 300. The FGM may include a coating, such as anodization, and/or a bulk material that comprises first body 100 and/or second body 200. The FGM may be positioned within any suitable portion of first body 100 and/or of second body 200. As examples, the FGM may define at least a portion of gland 210, may define at least a portion of first body 100 that contacts resilient sealing body 300, and/or may define at least a portion of second body 200 that contact resilient sealing body 300.

As discussed, retention structures 220 may be configured to retain resilient sealing bodies 300 within glands 210. As such, sealing structures 20 disclosed herein may not include, may not utilize, and/or may be free of an adhesive that extends between resilient sealing body 300 and second body 200 and/or that retains resilient sealing body 300 within gland 210. Stated another way, resilient sealing body 300 may not be retained within gland 210 by the adhesive.

In general, sealing structures 20, which are disclosed herein, may be formed and/or manufactured utilizing any suitable manufacturing process, including but not limited to any suitable molding process, any suitable machining process, any suitable subtractive machining process, and/or any suitable additive machining process. However, the cross-sectional shape of glands 210 may be most readily, or economically, formed via additive manufacturing processes.

FIG. 12 is a cutaway side view of a valve assembly 400, according to the present disclosure, in a closed position, while FIG. 13 is a cutaway side view of valve assembly 400 in an open position. Valve assembly 400 includes a valve body 405 that may include and/or be formed from a first body half 410 and a second body half 420. Valve body 405 defines a central cavity 402, an inlet 412 to central cavity 402, and an outlet 422 from central cavity 402. Valve body 405 also defines a body-side sealing surface 416, which is proximate inlet 412 and at least partially defines, or is located within, central cavity 402. Valve body 405 further defines a spring seat 426, which is proximate outlet 422 and at least partially defines, or is located within, central cavity 402.

Valve assembly 400 further includes a spring 490, which is operatively engaged with spring seat 426, and a poppet 500, which defines a poppet-side sealing surface 516. The coil spring may be substituted for a leaf-spring, a pneumatic piston, or another suitable biasing structure. Poppet 500 is oriented within central cavity 402 such that poppet-side sealing surface 516 is proximate body-side sealing surface 416, and spring 490 is oriented within central cavity 402 such that spring 490 presses against poppet 500 and urges poppet-side sealing surface 516 into sealing engagement with body-side sealing surface 416.

Valve assembly 400 further includes a sealing structure 20, which is configured to facilitate sealing engagement between poppet-side sealing surface 516 and body-side sealing surface 416. Sealing structure 20 may include any suitable structure, function, and/or feature of any sealing structure 20 of any of FIGS. 1-11. As an example, valve body 405 and/or first body half 410 thereof may include, be, and/or be defined by one of first body 100 of FIG. 1 and second body 200 of FIG. 1, while poppet 500 may include, be, and/or be defined by the other of first body 100 of FIG. 1 and second body 200 of FIG. 1.

As a more specific example, and as illustrated in FIGS. 12-13, valve body 405 may include, be, and/or be defined by first body 100 of FIGS. 1-2, while poppet 500 may include, be, and/or be defined by second body 200 of FIG. 1. Under these conditions, poppet 500 may define a gland 210, and a resilient sealing body 300 may be positioned within the gland. Valve assemblies 400 that include sealing structures 20, according to the present disclosure, may experience less tribologically induced wear when compared to conventional valve assemblies, which do not include resilient sealing body 300. This decrease in wear may be due to resilient sealing body 300 absorbing a portion of the energy that is dissipated upon closing of the valve assembly and/or upon physical engagement between valve body 405 and poppet 500.

Valve assembly 400 also may be referred to herein as and/or may be a check valve 400, a check valve assembly 400, and/or a poppet check valve 400. During operation of valve assembly 400, spring 490 may bias poppet 500 toward the closed position that is illustrated in FIG. 12. However, application of greater than a threshold pressure differential between inlet 412 and outlet 422 may cause valve assembly 400 to transition to the open position that is illustrated in FIG. 13. Subsequently, the pressure differential may be decreased to less than the threshold pressure differential, and valve assembly 400 may transition back to the closed position of FIG. 12.

FIGS. 14-19 provide additional examples of poppets 500 that may be included in and/or utilized with valve assemblies 400, according to the present disclosure. These poppets 500 include various configurations for gland 210 and are discussed generally above.

As illustrated collectively by FIGS. 14-19, poppets 500 may include an elongate central core 510 having a first core end 511, a second core end 512, and an outer core surface 514 that extends between first core end 511 and second core end 512. First core end 511 may define, or be, poppet-side sealing surface 516. As also illustrated collectively by FIGS. 14-19, poppets 500 also may include an elongate outer skit 540 having a first skirt end 541, a second skirt end 542, an outer skirt surface 544 that extends between first skirt end 541 and second skirt end 542, and an inner skirt surface 552 that extends between first skirt end 541 and second skirt end 542. As illustrated in FIGS. 14 and 16-18, poppet 500 further may include at least one guide vane 560, which extends between outer core surface 514 and inner skirt surface 552.

As illustrated in FIG. 16, fluid conduits 240, when present, may extend between gland 210 and a central cavity 520 that extends within poppet 500 and/or that is defined by elongate central core 510. As illustrated in FIG. 17, fluid conduits 240, when present, may extend between gland 210 and outer core surface 514 of elongate central core 510. As illustrated in FIG. 18, second body 200 may define a plurality of fluid conduits 240.

FIG. 20 is a schematic cross-sectional view of a portion of another valve assembly 400 according to the present disclosure. Valve assembly 400 of FIG. 20 also may be referred to herein as a membrane valve assembly 400, as a check valve assembly 400, as a stacked disk check valve assembly 400, and/or as a membrane check valve assembly 400. Valve assembly 400 includes a valve body 405, a membrane disk 580, and a sealing structure 20. Valve body 405 defines a body-side sealing surface 416, and membrane disk 580 defines a disk-side sealing surface 586 that faces toward body-side sealing surface 416.

Similar to valve assembly 400 of FIGS. 12-19, valve assembly 400 of FIG. 20 is configured to transition between an open position, which is illustrated in FIG. 20 and in which the valve assembly permits a fluid flow 50 therethrough, and a closed position, in which the valve assembly restricts the fluid flow therethrough, and sealing structure 20 is configured to form a fluid seal between valve body 405 and membrane disk 580 when valve assembly 400 of FIG. 20 is in the closed position.

Illustrative, non-exclusive examples of inventive subject matter according to the present disclosure are described in the following enumerated paragraphs:

A1. A sealing structure, comprising:
a first body defining a first surface;
a second body defining:
(i) a second surface;
(ii) a gland extending into the second body from the second surface and defining a gland opening on the second surface; and
(iii) a retention structure projecting partially across the gland to at least partially define the gland opening; and
a resilient sealing body positioned within the gland, wherein:
(i) the retention structure retains the resilient sealing body within the gland; and
(ii) the resilient sealing body forms a fluid seal between the first body and the second body when the resilient sealing body is brought into pressing engagement with both the first surface and the gland.

A2. The sealing structure of paragraph A1, wherein at least one of:
(i) the retention structure is rotationally, or radially, symmetric about a central point; and
(ii) the retention structure may be radially balanced about a central point.

A3. The sealing structure of any of paragraphs A1-A2, wherein the retention structure is continuous along a length, along a perimeter, or along an edge of the gland.

A4. The sealing structure of any of paragraphs A1-A3, wherein the retention structure defines a rounded resilient sealing body-compressing edge that at least partially defines the gland opening.

A5. The sealing structure of any of paragraphs A1-A4, wherein the retention structure includes a first retaining edge, which projects across a first side of the gland opening, and a second retaining edge, which projects across an opposed second side of the gland opening.

A6. The sealing structure of paragraph A5, wherein the first retaining edge and the second retaining edge define an edge angle relative to the second surface, optionally wherein the edge angle is at least one of:
  (i) at least 10 degrees, at least 15 degrees, at least 20 degrees, at least 25 degrees, at least 30 degrees, at least 35 degrees, at least 37 degrees, at least 39 degrees, or at least 41 degrees; and
  (ii) at most 60 degrees, at most 55 degrees, at most 53 degrees, at most 51 degrees, at most 49 degrees, at most 47 degrees, or at most 45 degrees.

A7. The sealing structure of any of paragraphs A5-A6, wherein the first retaining edge is continuous about a first circumference of a first edge that defines a first side of the gland opening.

A8. The sealing structure of any of paragraphs A5-A7, wherein the second retaining edge is continuous about a second circumference of a second edge that defines a second side of the gland opening.

A9. The sealing structure of any of paragraphs A1-A8, wherein the gland opening defines an opening width, wherein, prior to being positioned within the gland, the resilient sealing body defines a maximum transverse cross-sectional dimension, and further wherein the opening width is less than the maximum transverse cross-sectional dimension of the resilient sealing body.

A10. The sealing structure of paragraph A9, wherein the opening width is sized to retain the resilient sealing body within the gland.

A11. The sealing structure of any of paragraphs A9-A10, wherein the opening width is at least one of:
  (i) at most 95%, at most 90%, at most 85%, at most 80%, or at most 75% of the maximum transverse cross-sectional dimension of the resilient sealing body; and
  (ii) at least 45%, at least 48%, at least 50%, at least 53%, at least 55%, at least 60%, at least 65%, at least 70%, at least 75%, at least 80%, or at least 85% of the maximum transverse cross-sectional dimension of the resilient sealing body.

A12. The sealing structure of any of paragraphs A1-A11, wherein the gland opening defines an/the opening width, wherein the gland defines a maximum transverse cross-sectional extent as measured parallel to the second surface, and further wherein the opening width is less than the maximum transverse cross-sectional extent.

A13. The sealing structure of paragraph A12, wherein the opening width is at least one of:
  (i) at most 95%, at most 90%, at most 85%, at most 80%, or at most 75% of the maximum transverse cross-sectional extent; and
  at least 50%, at least 55%, at least 60%, at least 65%, at least 70%, at least 75%, or at least 80% of the maximum transverse cross-sectional extent.

A14. The sealing structure of any of paragraphs A1-A13, wherein the gland opening defines an/the opening width, and further wherein the opening width is uniform, or at least substantially uniform, along a length of the gland opening, along a perimeter of the gland opening, or along an edge that defines the gland opening.

A15. The sealing structure of any of paragraphs A1-A14, wherein the gland is rotationally, or radially, symmetric about a/the central point.

A16. The sealing structure of any of paragraphs A1-A15, wherein a transverse cross-sectional shape of the gland is at least one of:
  (i) at least partially circular;
  (ii) gibbous;
  (iii) at least partially square;
  (iv) at least partially triangular;
  (v) at least partially elliptical;
  (vi) at least partially pentagonal;
  (vii) at least partially diamond-shaped;
  (viii) at least partially arcuate;
  (ix) at least partially polygonal;
  (x) at least partially pentagonal; and
  (xi) at least partially triangular.

A17. The sealing structure of any of paragraphs A1-A16, wherein the gland is free of both a tool entry point and a tool exit point.

A18. The sealing structure of any of paragraphs A1-A17, wherein the gland includes a resilient sealing body-retaining region and a projecting region that projects away from the resilient sealing body-retaining region and into the second body.

A19. The sealing structure of paragraph A18, wherein the projecting region is configured to permit fluid flow around the resilient sealing body.

A20. The sealing structure of any of paragraphs A18-A19, wherein the projecting region is configured to facilitate heat transfer between the resilient sealing body and the second body.

A21. The sealing structure of any of paragraphs A18-A20, wherein the projecting region is configured to facilitate deformation of a/the transverse cross-section of the gland based, at least in part, on at least one of:
  (i) a temperature of the second body; and
  (ii) a clamping force between the first body and the second body.

A22. The sealing structure of any of paragraphs A1-A21, wherein the second body includes a first material with a first coefficient of thermal expansion and a second material with a second coefficient of thermal expansion, which is different from the first coefficient of thermal expansion, and further wherein the gland is defined, or bordered, by both the first material and the second material.

A23. The sealing structure of paragraph A22, wherein a location and a coefficient of thermal expansion of each of the first material and the second material are selected to generate directed deformation of the gland with changes in a/the temperature of the second body.

A24. The sealing structure of any of paragraphs A1-A23, wherein the second body further includes a fluid conduit that opens into the gland.

A25. The sealing structure of paragraph A24, wherein the sealing structure further includes a back pressure source, and further wherein the fluid conduit fluidly interconnects the gland with the back pressure source, which is configured to provide a back pressure to the resilient sealing body to selectively regulate a separation pressure, or a cracking pressure, of the sealing structure.

A26. The sealing structure of any of paragraphs A24-A25, wherein the sealing structure further includes a lubricant source, and further wherein the fluid conduit fluidly interconnects the gland with the lubricant source, which is configured to provide a lubricant to the gland.

A27. The sealing structure of any of paragraphs A24-A26, wherein the sealing structure further includes a motive fluid source, and further wherein the fluid conduit fluidly interconnects the gland with the motive fluid source, which is configured to provide a motive force for sweeping motion of the resilient sealing body within the gland.

A28. The sealing structure of any of paragraphs A24-A27, wherein the sealing structure further includes a sensor, and further wherein the fluid conduit fluidly interconnects the gland with the sensor.

A29. The sealing structure of paragraph A28, wherein the sensor is configured to at least one of:
  (i) detect a pressure within the gland;
  (ii) detect a pressure;
  (iii) detect the fluid seal between the first surface and the second surface; and
  (iv) detect an absence of the fluid seal between the first surface and the second surface.

A30. The sealing structure of any of paragraphs A1-A29, wherein the sealing structure further includes an electrically conductive conduit extending within the second body and in electrical communication with the gland.

A31. The sealing structure of any of paragraphs A1-A30, wherein the sealing structure further includes a seal detection structure configured to detect the fluid seal between the first surface and the second surface.

A32. The sealing structure of paragraph A31, wherein the seal detection structure includes at least a first electrically conductive surface, which is defined on the first body, and a second electrically conductive surface, which is defined on the second body, and further wherein the seal detection structure is configured to detect electrical contact between the first electrically conductive surface and the second electrically conductive surface.

A33. The sealing structure of paragraph A32, wherein the resilient sealing body is an electrically conductive resilient sealing body, and further wherein the seal detection structure is configured to detect electrical contact between the first electrically conductive surface and the second electrically conductive surface via the electrically conductive resilient sealing body.

A34. The sealing structure of any of paragraphs A31-A33, wherein the seal detection structure is configured to detect at least one of:
  (i) a presence of the fluid seal;
  (ii) an absence of the fluid seal;
  (iii) chatter of the fluid seal; and
  (iv) seal rupturing impact between the first body and the second body.

A35. The sealing structure of any of paragraphs A1-A34, wherein the second body further includes a magnetic material in magnetic communication with the gland, wherein the resilient sealing body is a magnetic resilient sealing body, and further wherein the sealing structure is configured to retain the resilient sealing body within the gland via a magnetic interaction between the magnetic material and the magnetic resilient sealing body.

A36. The sealing structure of any of paragraphs A1-A35, wherein the second body further defines at least one slit, which is proximal the gland and extends from the second surface and into the second body.

A37. The sealing structure of paragraph A36, wherein the at least one slit include a pair of opposed slits on opposed sides of the gland.

A38. The sealing structure of any of paragraphs A1-A37, wherein the at least one slit is configured to facilitate deformation of the gland.

A39. The sealing structure of any of paragraphs A1-A38, wherein the resilient sealing body includes, or is, an O-ring.

A40. The sealing structure of any of paragraphs A1-A39, wherein a transverse cross-sectional shape of the resilient sealing body is at least one of:
  (i) round;
  (ii) at least partially round;
  (iii) elliptical;
  (iv) at least partially elliptical;
  (v) square;
  (vi) at least partially square;
  (vii) rectangular;
  (viii) at least partially rectangular;
  (ix) X-shaped;
  (x) at least partially X-shaped;
  (xi) arcuate;
  (xii) at least partially arcuate;
  (xiii) polygonal;
  (xiv) at least partially polygonal;
  (xv) hollow;
  (xvi) at least partially hollow;
  (xvii) porous;
  (xviii) at least partially porous;
  (xix) pentagonal;
  (xx) at least partially pentagonal;
  (xxi) triangular; and
  (xxii) at least partially triangular.

A41. The sealing structure of any of paragraphs A1-A40, wherein the resilient sealing body is formed from at least one of:
  (i) a polymer;
  (ii) a fluoropolymer;
  (iii) a rubber;
  (iv) a nitrile rubber;
  (v) an ethylene polyene diene terpolymer;
  (vi) a fluorosilicone;
  (vii) a polytetrafluoroethylene;
  (viii) a polyurethane;
  (ix) a silicone;
  (x) a fluoroelastomer;
  (xi) a metal;
  (xii) a stainless steel;
  (xiii) copper;
  (xiv) an electrically conductive material;
  (xv) an electrically insulating material;
  (xvi) an electrostatic discharge-resistant material,
  (xvii) a Carbon Matrix Composite; and
  (xviii) gold.

A42. The sealing structure of any of paragraphs A1-A41, wherein the resilient sealing body has a Shore hardness of at least one of:
  (i) A50 to A55;
  (ii) A60 to A75;
  (iii) A80 to A90; and
  (iv) D51 to D55.

A43. The sealing structure of any of paragraphs A1-A42, wherein the sealing structure is free of an adhesive.

A44. The sealing structure of any of paragraphs A1-A43, wherein the resilient sealing body is not retained within the gland by an/the adhesive.

A45. The sealing structure of any of paragraphs A1-A44, wherein at least one, and optionally both, of the first body and the second body is formed from at least one of:

(i) an aluminum alloy;
(ii) an aluminum silicon magnesium alloy;
(iii) a superalloy;
(iv) a titanium alloy;
(v) a titanium aluminum vanadium alloy;
(vi) a polymer;
(vii) a polyetherketoneketone;
(viii) an acrylonitrile butadiene styrene;
(ix) a poly(lactic) acid;
(x) Inconel™;
(xi) a ferrous metal;
(xii) stainless steel;
(xiii) an organic material;
(xiv) a naturally occurring material;
(xv) a flexible material;
(xvi) an inflatable material; and
(xvii) bamboo.

A46. The sealing structure of any of paragraphs A1-A45, wherein the second body is formed utilizing at least one of an additive manufacturing technique and a casting technique.

A47. The sealing structure of any of paragraphs A1-A46, wherein the gland is a first gland that defines a first gland opening, wherein the resilient sealing body is a first resilient sealing body, and further wherein the sealing structure includes:
a second gland; and
a second resilient sealing body positioned within the second gland.

A48. The sealing structure of paragraph A47, wherein the second gland at least one of:
(i) is defined by the first body; and
(ii) is defined by the second body.

A49. The sealing structure of any of paragraphs A47-A48, wherein the retention structure is a first retention structure, and further wherein the sealing structure includes a second retention structure that at least partially defines the second gland.

A50. The sealing structure of paragraph A49, wherein the second retention structure includes any suitable structure of the retention structure of any of paragraphs A1-A46.

A51. The sealing structure of any of paragraphs A49-A50, wherein the second gland includes any suitable structure of the gland of any of paragraphs A1-A46.

A52. The sealing structure of any of paragraphs A49-A51, wherein the second resilient sealing body includes any suitable structure of the resilient sealing body of any of paragraphs A1-A46.

B1. A check valve assembly, comprising:
a valve body defining:
(i) a central cavity;
(ii) an inlet to the central cavity;
(iii) an outlet from the central cavity;
(iv) a body-side sealing surface within the central cavity and proximate the inlet; and
(v) a spring seat within the central cavity and proximate the outlet;
a spring operatively engaged, or mated, with the spring seat; and
a poppet defining a poppet-side sealing surface, wherein:
(i) the poppet is oriented, within the central cavity, such that the poppet-side sealing surface is proximate the body-side sealing surface;
(ii) the spring is oriented, within the central cavity, to press against the poppet and to urge the poppet-side sealing surface into sealing engagement with the body-side sealing surface;
(iii) the valve body is defined by one of the first body and the second body of any of paragraphs A1-A52; and
(iv) the poppet is defined by the other of the first body and the second body of any of paragraphs A1-A52.

B2. The valve assembly of paragraph B1, wherein the poppet includes an elongate central core having a first core end, a second core end, and an outer core surface extending between the first core end and the second core end, wherein the first core end defines the poppet-side sealing surface, optionally which is configured to form a fluid seal with the body-side sealing surface.

B3. The valve assembly of paragraph B2, wherein the poppet further includes an elongate outer skirt having a first skirt end, a second skirt end, an outer skirt surface, and an inner skirt surface, wherein the outer skirt surface and the inner skirt surface extend between the first skirt end and the second skirt end.

B4. The valve assembly of paragraph B3, wherein the poppet further includes at least one guide vane radially extending between the outer core surface and the inner skirt surface.

C1. A stacked disk check valve assembly, comprising:
a valve body defined by one of the first body and the second body of any of paragraphs A1-A52; and
a membrane disk defined by the other of the first body and the second body of any of paragraphs A1-A52.

As used herein, the terms "selective" and "selectively," when modifying an action, movement, configuration, or other activity of one or more components or characteristics of an apparatus, mean that the specific action, movement, configuration, or other activity is a direct or indirect result of user manipulation and/or influence of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related, quasi-related, or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," the abbreviation "e.g.," the phrase "exempla gratia," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, pattern, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A sealing structure, comprising:
   a first body defining a first surface;
   a second body defining:
   (i) a second surface;
   (ii) a gland extending into the second body from the second surface and defining a gland opening on the second surface; and
   (iii) a retention structure projecting partially across the gland to at least partially define the gland opening;
   a resilient sealing body positioned within the gland, wherein:
   (i) the retention structure retains the resilient sealing body within the gland; and
   (ii) the resilient sealing body forms a fluid seal between the first body and the second body when the resilient sealing body is brought into pressing engagement with both the first surface and the gland; and
   a seal detection structure configured to detect the fluid seal between the first surface and the second surface, wherein the seal detection structure includes at least a first electrically conductive surface, which is defined on the first body, and a second electrically conductive surface, which is defined on the second body, wherein the resilient sealing body is an electrically conductive resilient sealing body, and further wherein the seal detection structure is configured to detect electrical contact between the first electrically conductive surface and the second electrically conductive surface via the electrically conductive resilient sealing body.

2. The sealing structure of claim 1, wherein the retention structure at least one of:
   (i) is rotationally symmetric about a central point; and
   (ii) is continuous along an edge of the gland.

3. The sealing structure of claim 1, wherein the retention structure includes a first retaining edge, which projects across a first side of the gland opening, and a second retaining edge, which projects across an opposed second side of the gland opening.

4. The sealing structure of claim 3, wherein the first retaining edge is continuous about a first circumference of a first edge that defines a first side of the gland opening, and further wherein the second retaining edge is continuous about a second circumference of a second edge that defines a second side of the gland opening.

5. The sealing structure of claim 1, wherein the gland includes a resilient sealing body-retaining region and a projecting region that projects away from the resilient sealing body-retaining region and into the second body.

6. The sealing structure of claim 5, wherein the projecting region is configured to facilitate deformation of a transverse cross-section of the gland based, at least in part, on at least one of:
   (i) a temperature of the second body; and
   (ii) a clamping force between the first body and the second body.

7. The sealing structure of claim 1, wherein the second body includes a first material with a first coefficient of thermal expansion and a second material with a second coefficient of thermal expansion, which is different from the first coefficient of thermal expansion, and further wherein the gland is defined by both the first material and the second material.

8. The sealing structure of claim 1, wherein the second body further includes a fluid conduit that opens into the gland, wherein the sealing structure further includes a back pressure source, wherein the fluid conduit fluidly interconnects the gland with the back pressure source, which is configured to provide a back pressure to the resilient sealing body to selectively regulate a cracking pressure of the sealing structure.

9. The sealing structure of claim 1, wherein the sealing structure further includes an electrically conductive conduit extending within the second body and in electrical communication with the gland.

10. The sealing structure of claim 1, wherein the second body further includes a magnetic material in magnetic communication with the gland, wherein the resilient sealing body is a magnetic resilient sealing body, and further wherein the sealing structure is configured to retain the resilient sealing body within the gland via a magnetic interaction between the magnetic material and the magnetic resilient sealing body.

11. The sealing structure of claim 1, wherein the second body further defines at least one slit, which is proximal the gland and extends from the second surface and into the second body.

12. The sealing structure of claim 1, wherein the resilient sealing body is an O-ring.

13. The sealing structure of claim 1, wherein a transverse cross-sectional shape of the resilient sealing body is at least one of:
(i) round;
(ii) at least partially round;
(iii) elliptical;
(iv) at least partially elliptical;
(v) square;
(vi) at least partially square;
(vii) rectangular;
(viii) at least partially rectangular;
(ix) X-shaped;
(x) at least partially X-shaped;
(xi) arcuate;
(xii) at least partially arcuate;
(xiii) polygonal; and
(xiv) at least partially polygonal.

14. The sealing structure of claim 1, wherein the second body is formed via an additive manufacturing process.

15. The sealing structure of claim 1, wherein the gland is a first gland that defines a first gland opening, wherein the resilient sealing body is a first resilient sealing body, and further wherein the sealing structure includes:
a second gland; and
a second resilient sealing body positioned within the second gland.

16. The sealing structure of claim 1, wherein the second body further includes a fluid conduit that opens into the gland, wherein the sealing structure further includes a lubricant source, wherein the fluid conduit fluidly interconnects the gland with the lubricant source, which is configured to provide a lubricant to the gland.

17. The sealing structure of claim 1, wherein the second body further includes a fluid conduit that opens into the gland, wherein the sealing structure further includes a motive fluid source, wherein the fluid conduit fluidly interconnects the gland with the motive fluid source, which is configured to provide a motive force for sweeping motion of the resilient sealing body within the gland.

18. The sealing structure of claim 1, wherein the second body further includes a fluid conduit that opens into the gland, wherein the sealing structure further includes a sensor, wherein the fluid conduit fluidly interconnects the gland with the sensor.

19. The sealing structure of claim 1, wherein the seal detection structure is configured to detect at least one of:
(i) a presence of the fluid seal; and
(ii) an absence of the fluid seal.

20. The sealing structure of claim 1, wherein the seal detection structure is configured to detect at least one of:
(i) chatter of the fluid seal; and
(ii) seal rupturing impact between the first body and the second body.

* * * * *